US005726975A

United States Patent [19]
Ito

[11] Patent Number: 5,726,975
[45] Date of Patent: Mar. 10, 1998

[54] SWITCHING SYSTEM CAPABLE OF PERFORMING ALTERNATIVE ROUTING IN ACCORDANCE WITH AN ALTERNATIVE ROUTING SCENARIO ASSEMBLED IN A MAINTENANCE TERMINAL

[75] Inventor: Kiyotsugu Ito, Tokyo, Japan

[73] Assignee: NEC Corporation, Tokyo, Japan

[21] Appl. No.: 442,156

[22] Filed: May 16, 1995

[30] Foreign Application Priority Data

May 17, 1994 [JP] Japan ................... 6-102986

[51] Int. Cl.$^6$ ................................... H04J 3/14
[52] U.S. Cl. ........................... 370/228; 370/244
[58] Field of Search ................... 370/13, 14, 16, 370/16.1, 60, 60.1, 58.1, 58.2, 58.3, 225, 227, 228, 223, 224, 242, 244, 248, 250; 340/825.01, 825.03, 827; 379/279; 395/182.02, 183.19

[56] References Cited

U.S. PATENT DOCUMENTS

| 4,853,927 | 8/1989 | Wenzel ................. | 370/16 |
| 4,967,406 | 10/1990 | Yagi et al. ............. | 370/16 |
| 5,130,974 | 7/1992 | Kawamura et al. ....... | 370/16 |
| 5,189,662 | 2/1993 | Kleine-Altekamp ....... | 370/16 |
| 5,193,086 | 3/1993 | Satomi et al. .......... | 370/16 |
| 5,239,537 | 8/1993 | Sakauchi ............... | 370/16 |
| 5,398,236 | 3/1995 | Hemmady et al. ........ | 370/16 |
| 5,490,135 | 2/1996 | Hiraiwa et al. ......... | 370/16 |

FOREIGN PATENT DOCUMENTS

| 58-52768 | 12/1983 | Japan . |
| 61-203796 | 9/1986 | Japan . |
| 1106552 | 4/1989 | Japan . |
| 3106194 | 5/1991 | Japan . |

*Primary Examiner*—Chau Nguyen
*Attorney, Agent, or Firm*—Whitham, Curtis, Whitham & McGinn

[57] ABSTRACT

In a switching system including an alternative routing function, a maintenance terminal compiles an alternative routing scenario into a compiled alternative routing scenario. Connected to the maintenance terminal and an exchange switch for carrying out an exchange operation, an exchanging CPU carries out control of alternative route connection in accordance with the compiled alternative routing scenario to control the exchange switch when one of a fault and a congestion occurs in the leased line. The exchange CPU includes a maintenance terminal interface for receiving the compiled alternative routing scenario from the maintenance terminal. A basic connection control device produces a notification signal related to a leased line and an alternative line and carries out a basic connection control. An alternative routing scenario executing device stores the compiled alternative routing scenario therein executes alternative routing in accordance with the compiled alternative routing scenario in response to the notification signal by supplying the basic connection control device with an instruction signal.

3 Claims, 5 Drawing Sheets

FIG. 4

REGISTRATION FOR LINE C1

PASSING THROUGH LINE C2 ON LINE FAULT

REGISTRATION FOR ALTERNATIVE LINE C2

OPENING LINE C3 FOR ISDN ON LINE FAULT

TURNING TO LINE C1 ON RESTORATION OF FAULT IN LINE C1

REGISTRATION FOR ALTERNATIVE LINE C3

TURNING TO LINE C1 ON RESTORATION OF FAULT IN LINE C1

TURNING TO LINE C2 ON RESTORATION OF FAULT IN LINE C2

SWITCHING SYSTEM CAPABLE OF PERFORMING ALTERNATIVE ROUTING IN ACCORDANCE WITH AN ALTERNATIVE ROUTING SCENARIO ASSEMBLED IN A MAINTENANCE TERMINAL

BACKGROUND OF THE INVENTION

This invention relates to a switching system and an alternative routing method therefor and, in particular, to a method of registering and realizing an alternative routing scenario.

In a conventional alternative routing method of the type described, a plurality of alternative routing scenarios are preliminarily stored in a switching system, a maintenance engineer selects one of the alternative routing scenarios to be executed in accordance with a kind of alternative routing events. In the alternative routing method, the alternative routing scenarios to be selected are limited, and it is therefore difficult to satisfy various requests such as an alternative routing start condition and an alternative routing pattern by users. As a result an alternative routing scenario must be designed in correspondence with a user or a lot of alternative routing scenarios must be prepared for an exchange Central Processing Unit (CPU). In addition, although a lot of alternative routing scenarios are prepared, a request of the user is not always satisfied.

In another conventional alternative routing method, a switching system has a basic connection function for alternative routing alone, an alternative routing scenario is performed by an external device such as a network control unit. The alternative routing method is disadvantageous in that it is impossible to perform alternative routing when the external device does not operate due to a fault or turning off of a power source.

In addition, various prior art methods related to this invention have been already known in the art. Japanese Unexamined Patent Prepublication No. 106194/91 by Kazuji Komura et al disclosed "PRIVATE BRANCH EXCHANGE" to improve the service to an extension subscriber by receiving and relaying a dial signal from a subscriber and connecting the signal to a public network with bypassing when a private branch exchange identifies a received numeral from the subscriber as a call via a leased line trunk and routes of destination connections are all busy.

Japanese Unexamined Patent Prepublication No. 106552/89 by Nobuaki Shuda disclosed "MAIN WIRE ALTERNATING METHOD" to make an extension number of a called side private branch exchange directly connectable when no leased line is available because all leased lines are busy or a fault occurs by automatically transmitting the office number of the main wire registered in correspondence to the dial number of the leased line and the called extension number dialed at the time of transmission by combining the numbers and selecting the extension of the called private branch exchange.

Japanese Examined Utility Model Publication No. 52768/83 by Atsushi Kimura et al disclosed "PRIVATE BRANCH EXCHANGE" to make it possible to automatically carry out an alternative connection to a main wire without taking much time of an exchange operator when a telephone call cannot be made because a leased line route is busy by providing an exchange with a memory device and hooking detecting means wherein the memory device allocates the special number of the leased line route to the number of a main wire subscriber.

Japanese Unexamined Patent Prepublication No. 203796/86 by Katsu Akagi disclosed "STORED PROGRAM CONTROL EXCHANGE" to make it possible to change the sending trunk route selected by the transmission by the same access number by providing a means for temporarily changing the alternative route selection logic of a transmitter.

SUMMARY OF THE INVENTION

It is therefore an object of this invention to provide a switching system which is capable of performing alternative routing in accordance with an alternative routing scenario assembled in a maintenance terminal.

It is another object of this invention to provide an alternative routing method for the switching system of the type described, which is capable of performing the alternative routing in accordance with the alternative routing scenario assembled in the maintenance terminal.

Other objects of this invention will become clear as the description proceeds.

According to an aspect of this invention, a switching system includes an alternative routing function. The switching system comprises a maintenance terminal, supplied with an alternative routing function condition and an alternative routing pattern for generating an alternative routing scenario on the basis of the alternative routing function condition and the alternative routing pattern. The maintenance terminal compiles the alternative routing scenario to produce a compiled executable code indicative of the alternative routing scenario which is transferred to an exchange CPU. The exchange CPU carries out control of alternative route connection in accordance with the compiled executable code when one of a fault and a congestion occurs. The switching system thereby performs alternative routing on the basis of the alternative routing scenario assembled in the maintenance terminal in accordance with a necessary condition of a user.

According to another aspect of this invention, a method of performing alternative routing in a switching system is implemented. In the practice of the method, an alternative routing function condition and an alternative routing pattern are input to a maintenance terminal, and the maintenance terminal generates an alternative routing scenario on the basis of the alternative routing function condition and the alternative routing pattern. The maintenance terminal compiles the alternative routing scenario into an executable code indicative of the alternative routing scenario. The compiled code is transferred to an exchange CPU which carries out control of alternative route connection in accordance with the compiled executable code when one of a fault and a congestion occurs.

BRIEF DESCRIPTION OF THE DRAWING

FIG. 4 shows an alternative routing scenario for the communication network system illustrated in FIG. 3.

DESCRIPTION OF THE PREFERRED EMBODIMENT

Figure 1:
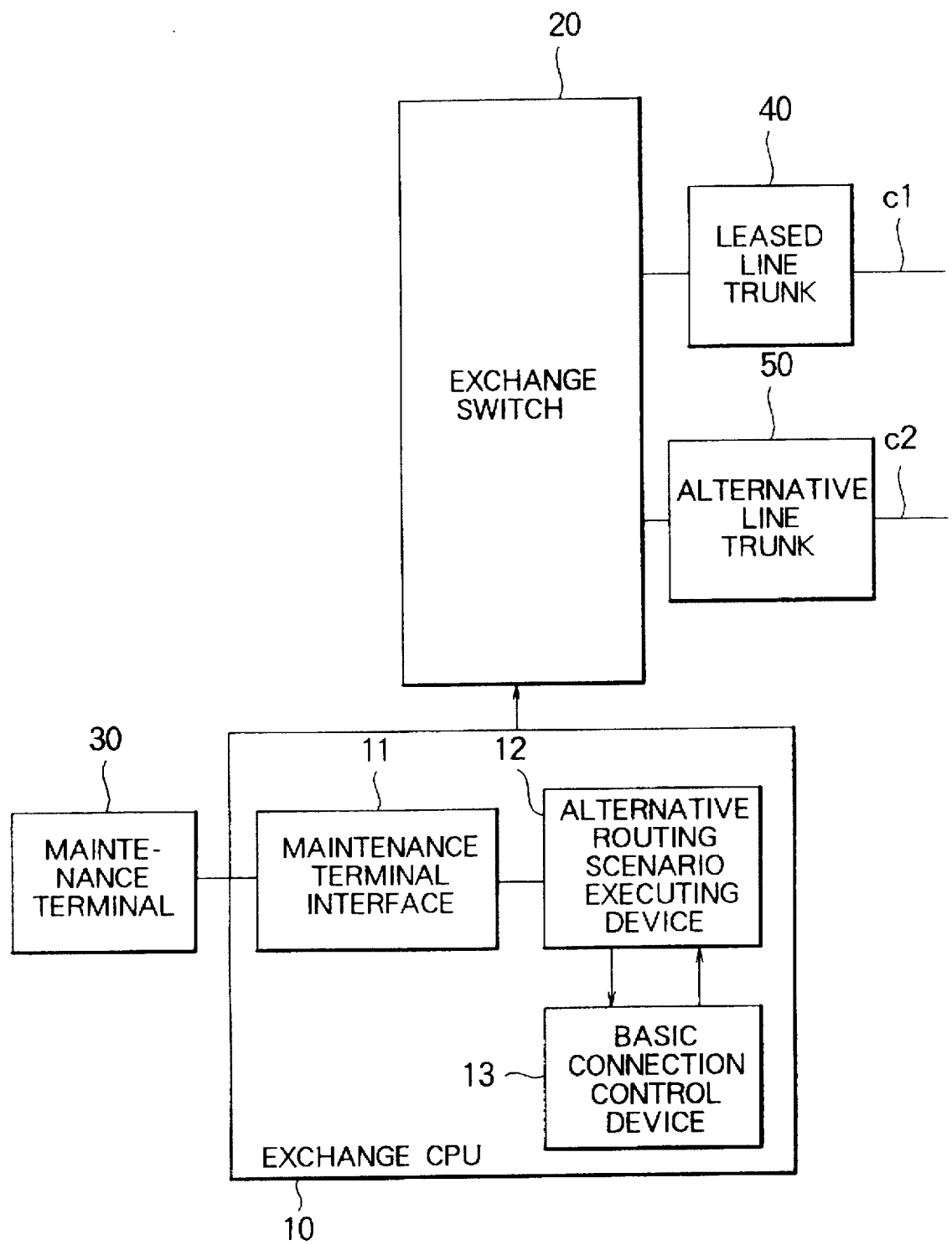
FIG. 1 is a block diagram of a switching system according to a preferred embodiment of this invention.

Referring to FIG. 1, a switching system according to a preferred embodiment of this invention comprises an exchange CPU 10, an exchange switch 20 controlled by the exchange CPU 10, a maintenance terminal 30 for supplying the exchange CPU 10 with an alternative routing scenario which will later be described, a leased line trunk 40 and an alternative line trunk 50 which are connected to the exchange switch 20 in common. The leased lane trunk 40 and the alternative line trunk 50 are connected to a leased line c2 and an alternative line c2, respectively. The exchange switch 20 carries out an exchange operation. The exchange CPU 10 comprises a maintenance terminal interface 11 connected to the maintenance terminal 30, an alternative routing scenario executing device 12 connected to the maintenance terminal interface 11, and a basic connection control device 13 connected to the alternative routing scenario executing device 12.

Description will be made as regards operation of 10 the switching system illustrated in FIG. 1. When a maintenance engineer (not shown) inputs an alternative routing function condition and an alternative routing pattern in the maintenance terminal 30, the maintenance terminal 30 generates an alternative routing scenario on the basis of the alternative routing function condition and the alternative routing pattern, compiles the alternative routing scenario into an executable code for the exchange CPU 10, and transfers a compiled alternative routing scenario in the form of the executable code to the exchange CPU 10.

In the exchange CPU 10, the maintenance terminal interface 11 receives the compiled alternative routing scenario and stores it in a memory (not shown) of the alternative routing scenario executing device 12. The basic connection control device 13 supplies the alternative routing scenario exchange device 12 with a notification signal indicative of detection of a line fault or congestion. Responsive to an instruction signal from the alternative routing scenario executing device 12, the basic connection Control device 13 performs a basic connection function such as a line blocking and a line opening. Responsive to the notification signal supplied from the basic connection control device 13, the alternative routing scenario executing device 12 executes the alternative routing in accordance with the compiled alternative routing scenario by instructing the basic connection control device 13 so as to control a basic connection such as fault line blocking and alternative line connection.

Figure 2:
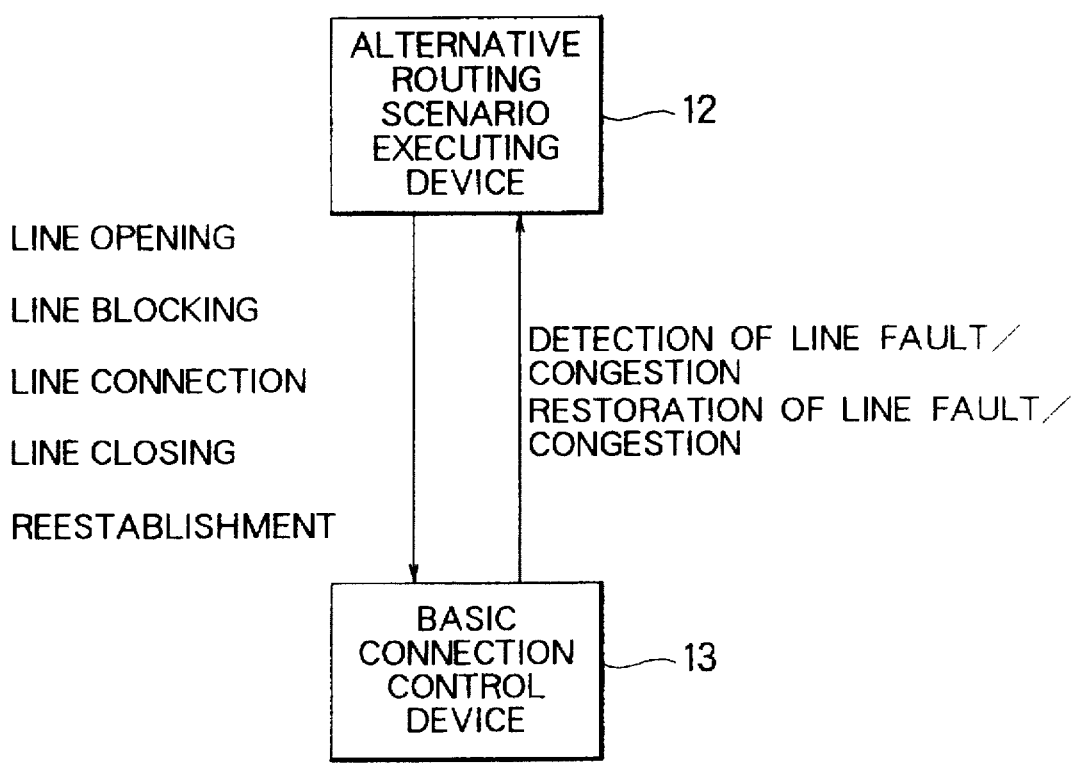
FIG. 2 shows a list of signals communicated between an alternative routing scenario executing device and a basic connection control device illustrated in FIG. 1.

FIG. 2 shows a list of signals communicated between the alternative rouging scenario executing device 12 and the basic connection control device 13. The alternative routing scenario executing device 12 supplies the basic connection control device 13 with the instruction signal indicative of one of line opening, line blocking, line connection, line cutting, and reestablishment. The basic connection control device 13 supplies the alternative routing scenario executing device 12 with the notification signal indicative of one of detection of line fault/congestion and restoration of line fault/congestion.

Figure 3:
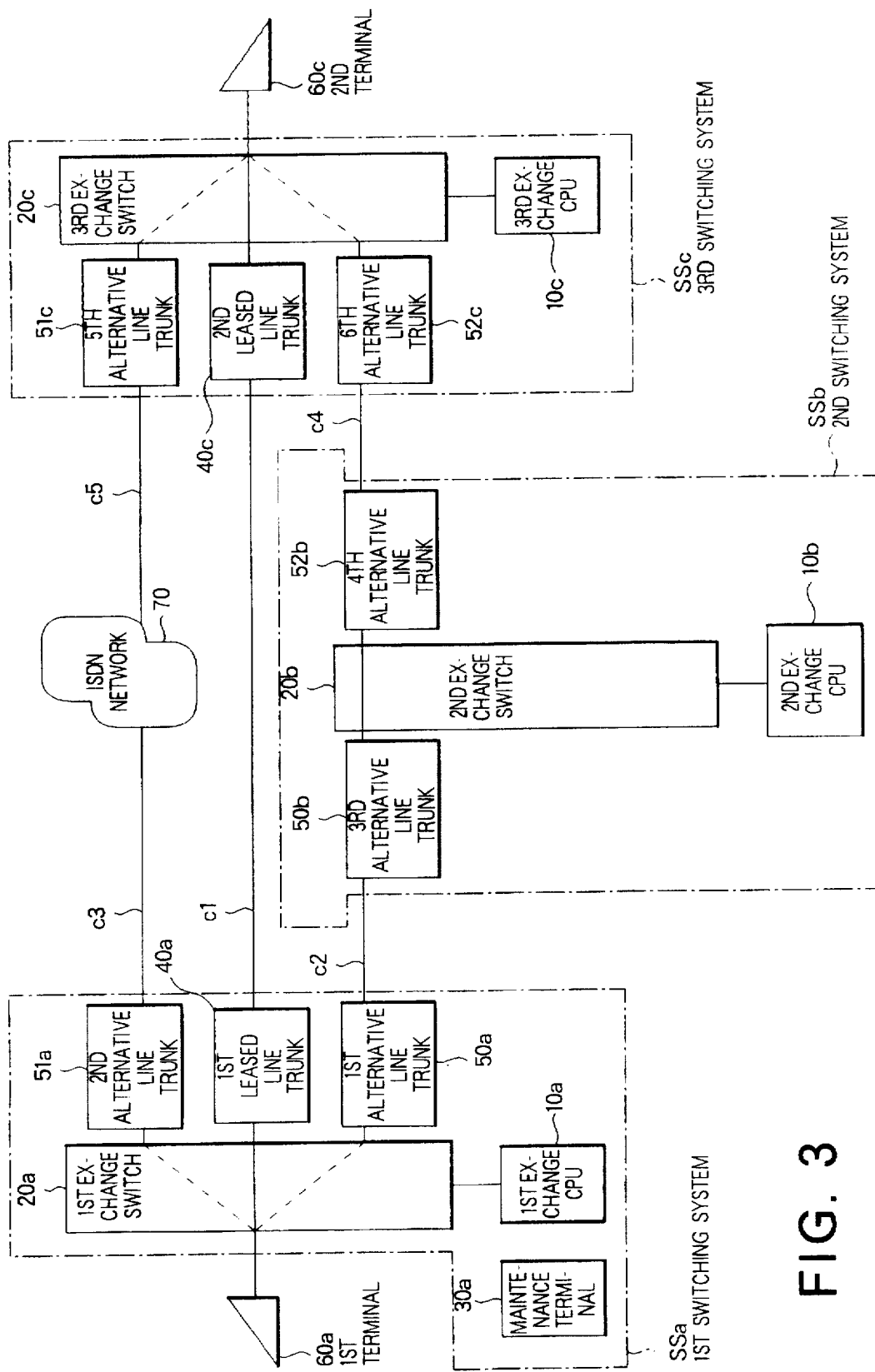
FIG. 3 shows a communication network system comprising the switching system according to this invention.

FIG. 3 shows a communication network system comprising the switching system according to this invention. The illustrated communication network system comprises first through third switching systems Ssa, SSb, and SSb. The first switching system SSa is the switching system according to this invention.

The first switching system SSa comprises a first exchange CPU 10a, a first exchange switch 20a, a maintenance terminal 30a, a first leased line trunk 40a, first and second alternative line trunks 50a and 51a. The first exchange switch 20a is connected to a first terminal 60a. The first leased line trunk 40a, the first and the second alternative line trunks 50a and 51a are connected to first through third lines c1, c2, c3, respectively.

The second switching system SSb comprises a second exchange CPU 10b, a second exchange switch 20b, and third and fourth alternative line trunks 50b and 52b. The third alternative line trunk 50b is connected to the first alternative line trunk 50a via the second line c2. The fourth alternative line trunk 52a is connected to a fourth line c4.

The third switching system SSc comprises a third exchange CPU 10c, a third exchange switch 20c, and a second leased line trunk 40c, and fifth and sixth alternative line trunks 51c and 52c. The third exchange switch 20c is connected to a second terminal 60c. The second leased line trunk 40c is connected to the first leased line trunk 40a through the first line c1. The sixth alternative line trunk 52a is connected to the fourth alternative line trunk 52b through the fourth line c4. The fifth alternative line trunk 51c is connected to the second alternative line trunk 51a through a fifth line c5, an integrated service digital network (ISDN) network 70, and the third line C3.

In this state, the first terminal 60a is connected to the second terminal 60c through the first exchange switch 20a, the first leased line trunk 40a, the first line c1, the second leased line trunk 40c, and the third exchange switch 20c.

Figure 5:
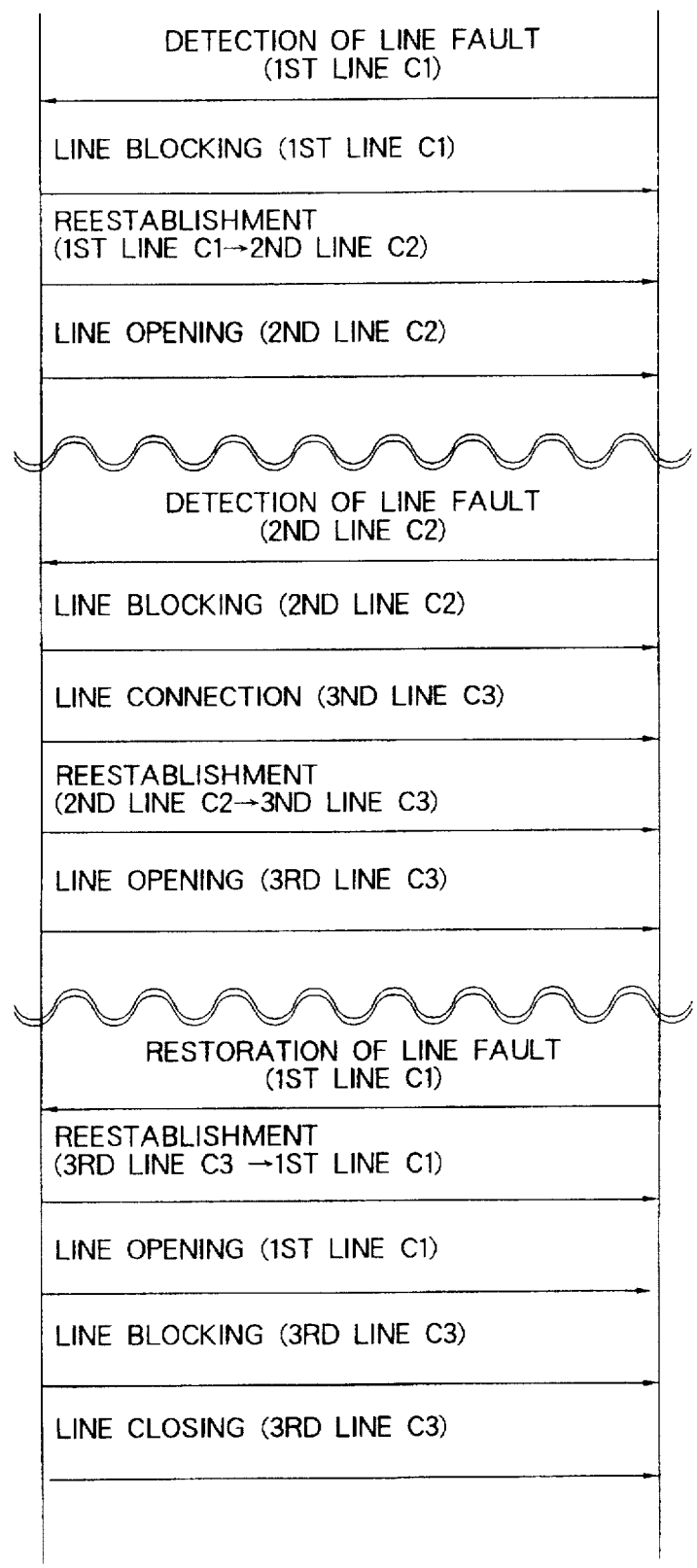
FIG. 5 shows a control sequence for use in describing operation of the communication network system illustrated in FIG. 3.

Referring to FIGS. 4 and 5 in addition to FIGS. 1 and 3, description will be made as regards registration of an alternative routing scenario and control of alternative routing in a case where the first switching system SSa performs alternative routing so that the first switching system SSa is connected to the third switching system SSc via the second line c2, the second switching system SSb and the fourth line c4 when a fault occurs in the first line c1 and the first switching system SSa performs alternative routing so that the first switching system SSa is connected to the third switching system SSc via the third line c3, the ISDN network 70, and the fifth line c5 when a fault occurs in the second line c2.

The maintenance engineer initially inputs an alternative routing scenario shown in FIG. 4 by the maintenance terminal 30a in the first switching system SSa. The maintenance terminal 30a compiles the alternative routing scenario shown in FIG. 4 into an executable code for the first exchange CPU 10a to transfer a Compiled alternative routing scenario to the first exchange CPU 10a. The first exchange CPU 10a stores the compiled alternative routing scenario via the maintenance terminal interface 11 (FIG. 1) in the memory of the alternative routing scenario executing device (FIG. 1).

It is now assumed that the first terminal 60a of the first switching system SSa communicates with the second terminal 60c of the third switching system SSc as shown in a solid line of FIG. 3. The first exchange CPU 10a detects a fault of the first line c1, the basic connection control device 13 (FIG. 1) supplies the alternative routing scenario executing device 12 (FIG. 1) with the notification signal indicative of detection of a line fault (detection of line fault (the first line c1) in FIG. 5). The alternative routing scenario executing device 12 supplies the basic connection control device 13 with the instruction signal indicative of line blocking (line blocking (the first line c1) in FIG. 5). Responsive to the instruction signal indicative of line blocking, the basic connection control device 13 blocks up the first line c1. The alternative routing scenario executing device 12 supplies the basic connection control device 13 with the instruction signal indicative of reestablishment (reestablishment (the first line c1→the second line c2) in FIG. 5). Responsive to the instruction signal indicative of reestablishment, the basic connection control device 13 reestablishes the first terminal 60a from the first line c1 to the second line c2. The alternative routing scenario executing device 12 supplies the basic connection control device 13 with the instruction signal indicative of line opening (line opening (the second line C2) in FIG. 5). Responsive to the instruction signal indicative of line opening, the basic connection control device 13 opens the second line c2. As a result, the first terminal 60a of the first switching system SSa is connected to the second terminal 60c of the third switching system SSc via the second line c2, the second switching system SSb, and the fourth line c4.

When the first exchange CPU 10a detects a fault of the second line c2 acting as an alternative line, the basic connection control device 13 supplies the alternative routing scenario executing device 12 with the notification signal indicative of detection of line fault (detection of line fault (the second line c2) in FIG. 5). The alternative routing scenario executing device 12 supplies the basic connection control device 13 with the instruction signal indicative of line blocking (line blocking (the second line C2) in FIG. 5). Responsive to the instruction signal indicative of line blocking, the basic connection control device 13 blocks the second line c2. The alternative routing scenario executing device 12 supplies the basic connection control device 13 with the instruction signal indicative of line connection (line connection (the third line c3) in FIG. 5). Responsive to the instruction signal indicative of line connection, the basic connection control device 13 opens the third line c3 via the ISDN network 70 between the first switching system SSa and the third switching system SSc. The alternative routing scenario executing device 12 supplies the basic connection control device 13 with the instruction signal indicative of reestablishment (reestablishment (the second line c2→the third line c3) in FIG. 5). Responsive to the instruction signal indicative of reestablishment, the basic connection control device 13 reestablishes the first terminal 60a from the second line c2 to the third line c3. The alternative routing scenario executing device 12 supplies the basic connection control device 13 with the instruction signal indicative of line opening (line opening (the third line c3) in FIG. 5). Responsive to the instruction signal indicative of line opening, the basic connection control device 13 opens the third line C3. As a result, the first terminal 60a of the first switching system SSa is connected to the second terminal 60c of the third switching system SSc via the third line c3 the ISDN network 70, and the fifth line c5.

When the first exchange CPU 10a detects restoration of the fault in the first line c1, the basic connection control device 13 supplies the alternative routing scenario executing device 12 with the notification signal indicative of restoration of line fault (restoration of line fault (the first line c1) in FIG. 5). The alternative routing scenario executing device 12 supplies the basic connection control device 13 with the instruction signal indicative of reestablishment (reestablishment (the third line c3→the first line c1) in FIG. 5). Responsive to the instruction signal indicative of reestablishment, the basic connection control device 13 reestablishes the first terminal 60a from the third line c3 to the first line c1. The alternative routing scenario executing device 12 supplies the basic connection control device 13 with the instruction signal indicative of line opening (line opening (the first line c1) in FIG. 5). Responsive to the instruction signal indicative of line opening, the basic connection control device 13 opens the first line c1 again. The alternative routing scenario executing device 12 supplies the basic connection control device 13 with the instruction signal indicative of line blocking 15 (line blocking (the third line c3) in FIG. 5). Responsive to the instruction signal indicative of line blocking, the basic connection control device 13 blocks up the third line c3. The alternative routing scenario executing device 12 supplies the basic connection control device 13 with the instruction signal indicative of line cutting (line cutting (the third line c3) in FIG. Responsive to the instruction signal indicative of line cutting, the basic connection control device 13 cuts the third line C3 for the ISDN network 70. As a result, the first terminal 60a of the first switching system SSa is connected to the second terminal 60c of the third switching system SSc via the first line c1 and thereby the communication network system returns to a connection state prior to occurrence of the fault.

While this invention has thus far been described in conjunction with a preferred embodiment thereof, it will now be readily possible for those skilled in the art to put this invention into practice in various other manners.

What is claimed is:

1. A switching system including an alternative routing function, comprising:

a maintenance terminal supplied with an alternative routing function condition and an alternative routing pattern for generating an alternative routing scenario on the basis of the alternative routing function condition and the alternative routing pattern and for compiling the alternative routing scenario to produce a compiled executable code indicative of the alternative routing scenario;

an exchange switch for carrying out an exchange operation;

a leased line trunk connected between said exchange switch and a leased line;

an alternative line trunk connected between said exchange switch and an alternative line; and an exchange central processing unit (CPU), connected to said maintenance terminal and said exchange switch, for carrying out control of alternative route connection in accordance with the compiled executable code to control said exchange switch when one of a fault and a congestion occurs in the leased line, wherein said exchange CPU comprises:

a maintenance terminal interface, connected to said maintenance terminal, for receiving the compiled executable code;

a basic connection control device for producing a notification signal related to the leased line and the alternative line and for carrying out a basic connection control; and an alternative routing scenario executing device, connected to said maintenance terminal interface and said basic connection control device, for storing the compiled executable code therein and for executing alternative routing in accordance with the compiled executable code in response to the notification signal by supplying said basic connection control device with an instruction signal.

2. A switching system according to claim 1, wherein said notification signal indicates one of detection of line fault/congestion and restoration of line fault/congestion.

3. A switching system according to claim 1, wherein said instruction signal indicates one of line opening, line blocking, line connection, line cutting, and reestablishment.

* * * * *